April 13, 1965     A. BOSCHI ETAL     3,177,559
METHOD OF MAKING A RESILIENT JOINT
Filed Feb. 28, 1963

*INVENTOR*

Antonio Boschi, et al
BY
*ATTORNEY*

United States Patent Office

3,177,559
Patented Apr. 13, 1965

3,177,559
METHOD OF MAKING A RESILIENT JOINT
Antonio Boschi and Giovanni Martorana, Milan, Italy, assignors to Società Applicazioni Gomma Antivibranti "SAGA" S.p.A., Milan, Italy
Filed Feb. 28, 1963, Ser. No. 261,767
Claims priority, application Italy, Jan. 9, 1963, 432/63
2 Claims. (Cl. 29—149.5)

This invention relates to a method of making resilent joints for interconnecting machine parts, of the type comprising two coaxial rigid bushings and an intermediate rubber member interposed between the two bushings.

The main characteristic feature of the resilient joint according to this invention consists in the fact that the joint comprises two coaxial rigid bushings, two rubber layers bonded to the two bushings, fully covering the facing surfaces of the bushings, and a layer of rigid rolling bodies, interposed between the two rubber layers, said rubber layers being radially pre-stressed against the layer of rolling bodies.

Further characteristic features and advantages of this invention will be understood from the appended description referring to the accompanying drawings, which are given by way of an example, wherein.

Figure 1:
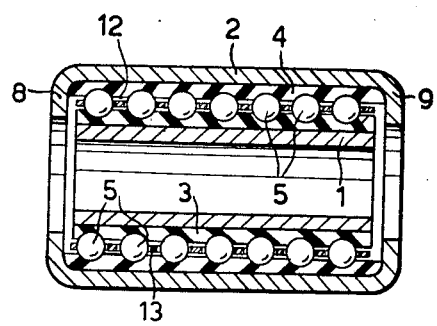
FIGURE 1 is an axial sectional view of an improved joint.

The improved resilent joint comprises two coaxial rigid bushings 1, 2, which, when assembled, leave an annular clearance therebetween.

The facing surface of the two bushings 1, 2 have bonded thereto two distinct rubber layers 3, 4 which fully cover the said surfaces and leave an intermediate annular clearance 12.

A layer of rigid rolling bodies 5 is arranged in the clearance 12, the two rubber layers 3, 4 being pre-stressed against the layer 5.

One at least of the bushings 1, 2 is provided at its ends with axial retaining means for the layer of rolling bodies 5.

Figure 2:
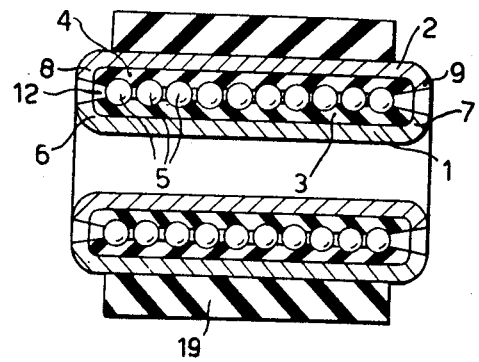
FIGURE 2 is an axial sectional view of a joint according to a modified embodiment.

In the example shown in FIGURE 2 both bushings 1, 2 are provided at both ends with such retaining means, each of which is formed by the edge portion of the bushing and its respective rubber layer bent towards the other bushing.

The bent over edges on the bushings 1, 2 are denoted by 6, 7 and 8, 9, respectively.

In the embodiment shown in FIGURE 1, the outer bushing 2 only is provided at its end with bent over retaining edges 8, 9, the inner bushing 1 being deprived of such edges.

In the figures the rolling bodies 5 comprise rigid balls, such as of steel or glass.

As shown in FIGURE 1, the balls 5 can be guided by spacer cages 13, preferably of a flexible material, such as rubber or rubberized cloth, or they can be free as shown in FIGURE 2.

Of course, the structure of the improved joint is not limited to the use of balls for the rolling bodies 5, as rollers having their axes maintained parallel with the axis of the joint can also be employed. In the latter case use of the spacer cage is essential for correct operation of the joint.

The radial and conical flexibility of the joint is a function both of the properties of the rubber employed in forming the layers 3 and 4, and of the prestress of said layers against the layer of rolling bodies 5.

The radial and conical flexibilities of the joint can therefore be varied within wide limits by acting on the properties of the rubber mix employed and pre-stress imposed on manufacture of the joint.

The torque strength of the joint depends upon the properties of the rubber mix employed for the layers 3 and 4, and upon the pre-stress against the layer of rolling bodies 5.

Once the properties of the mix and the pre-stress have been determined, the torque strength of the joint is constant and independent of the relative angular displacement of the bushings. This results in one of the advantages of the improved joint, namely, an inner and an outer bushing 1, 2 can undergo mutual angular displacements by any extent without thereby varying the reaction moment or without any risk of breakage of the resilient intermediate, as distinct from conventional joints, when mutual angular displacement of the bushings in the latter exceed a certain value.

When a very high radial (or conical) flexibility is required a rubber sleeve 19 can be bonded around the outer bushing 2, as shown in FIGURE 2.

The sleeve can in turn be secured to the machine structure by a strap or by forcing into a suitable seating, or by means of a metal bushing externally bonded thereto, or other means known per se.

The manufacturing method for the improved joint consists in arranging the two bushings 1, 2 provided with the rubber layers 3, 4 coaxially and inserting into the clearance 12 between two rubber layers 3, 4, a layer of rolling bodies 5 (FIGURE 3), possibly guided by a cage 13.

One of the two bushings is thereupon permanently deformed by effecting a change in its diameter, to thereby pre-stress the rubber layers 3, 4 against the layer of rolling bodies 5.

Of course the outer bushing can be acted upon by reducing its diameter, such as by drawing, or the inner bushing 1 can be acted upon by enlarging its diameter, such as by forcing a spine through its bore.

It may in certain cases be convenient to act on both bushings in the manner indicated above in order to reach high pre-stressing values.

Finally, the edge portions of the opposite ends of at least one of the bushings 1 and 2 are bent over, such as by cold forming the said end portions by punching tools according to the known technique.

Figure 3:
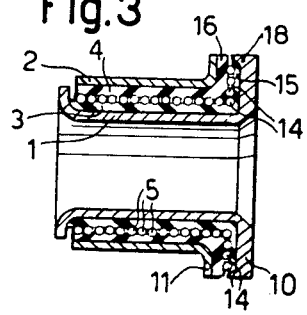
FIGURE 3 is an axial sectional view of a joint according to a further embodiment.

This invention is not limited to the exact configuration and arrangement of the parts as described or to their details, which can be widely modified without departing from the scope of this invention. For example, in certain cases, the improved joint can be conveniently formed as shown in FIGURE 3.

Referring to the latter figure, which shows a thrust and radial joint according to this invention, the ends of the two bushings 1 and 2 on the same side of the joint have securedly fixed thereto two flanges 10, 11 facing each other.

The flanges 10, 11 are covered on their opposite surfaces with two rubber layers 15, 16 bonded to the said surfaces, between which a layer of balls 5 is interposed.

One at least of the two flanges 10, 11 is provided on its circumferential edge with radial retaining means for the ball layer 14.

In the embodiment shown in FIGURE 3, it is the flange 10, carried by the bushing 1, which has its circumferential edge 18 and its respective rubber layer 15 bent over towards the other flange 11 to act as a radial retaining means for the ball layer 14.

Of the other two ends of the bushings 1, 2, situated on the other side of the joint, the end of the inner bushing 1 at least has its edge portion bent over towards the bushing in order to axially retain the layer of rolling bodies 5 interposed in the clearance 12 between the two rubber layers 3, 4. The layer of the rolling bodies 5 on the flanged side of the joint is axially retained by the flange 10 on its respective rubber layer 15.

What we claim is:

1. Method of manufacturing a resilient joint comprising concentrically arranging two cylindrical metal bushings covered on their surfaces facing each other with resilient rubber layers forming a radial clearance therebetween, inserting into said clearance a plurality of rigid rolling bodies in a circumferential arrangement in said clearance, permanently deforming one at least of the two bushings by effecting a change in its diameter thereby to radially compress the rubber layers against the rolling bodies, and turning-in and -out the ends of the outer and inner bushing, respectively.

2. Method of manufacturing a resilient joint comprising concentrically arranging two cylindrical metal bushings covered on their surfaces facing each other with resilient rubber layers forming a radial clearance therebetween, inserting into said clearance a plurality of rigid rolling bodies in a circumferential arrangement in said clearance, reducing the diameter of the outer bushing and enlarging the diameter of the inner bushing thereby to radially compress the rubber layers against the rolling bodies, and turning-in and -out the ends of the outer and inner bushing, respectively.

References Cited by the Examiner

UNITED STATES PATENTS

| | | | |
|---|---|---|---|
| 1,798,125 | 3/31 | Holmes. | |
| 2,007,152 | 7/35 | Allee | 308—184 |
| 2,240,285 | 4/41 | Chamberlain | 308—184 |
| 2,550,911 | 5/51 | Cobb | 308—201 |
| 2,594,578 | 4/52 | McNicoll | 308—174 |
| 2,641,516 | 6/53 | Bakane | 308—174 |
| 3,044,278 | 7/62 | Geisthoff | 308—201 X |
| 3,073,655 | 1/63 | Rowlett | 308—135 |
| 3,098,450 | 7/63 | Bower | 308—238 X |

WHITMORE A. WILTZ, *Primary Examiner.*

ROBERT C. RIORDON, *Examiner.*